Patented June 16, 1942

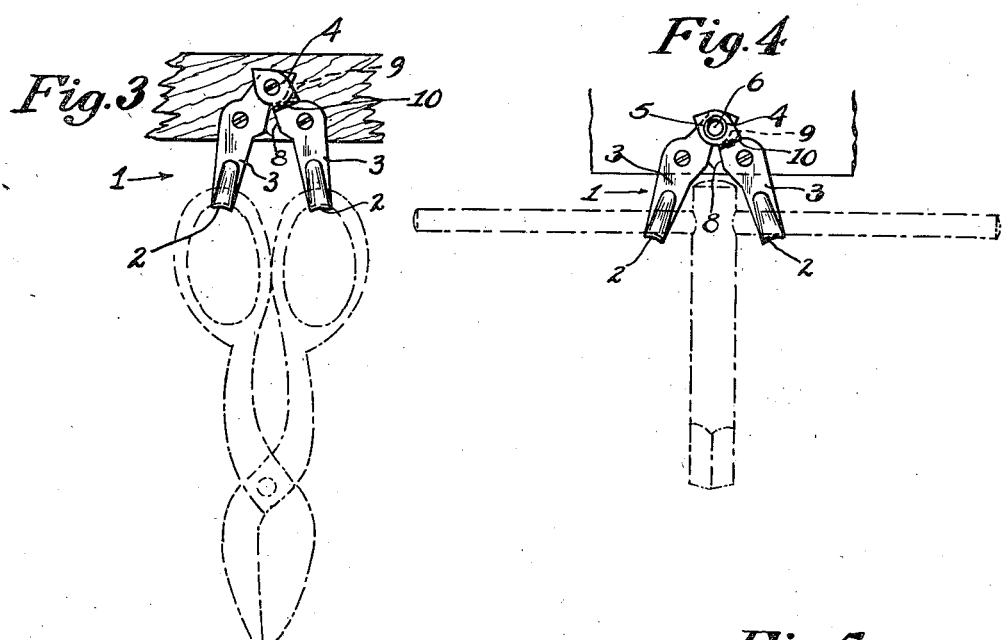
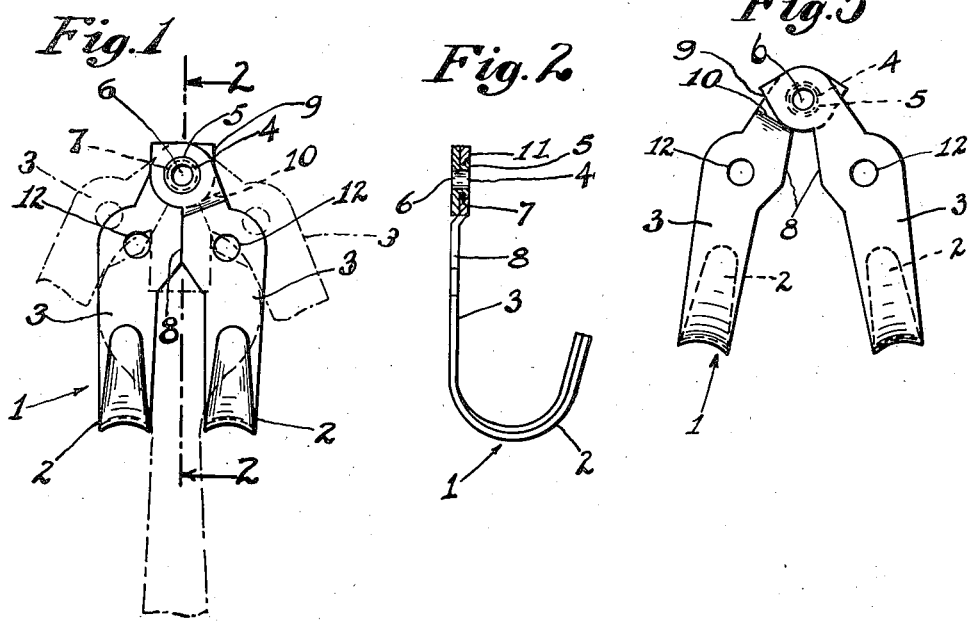

2,286,539

UNITED STATES PATENT OFFICE 2,286,539

ADJUSTABLE DOUBLE HOOK SUPPORT FIXTURE

Eric Hagerstrom, New York, N. Y.

Application July 24, 1940, Serial No. 347,127

8 Claims. (Cl. 248—215)

This invention relates to suspension devices or fixtures, and particularly to a double hook support as may be utilized for certain tools, implements, or other such articles, as machinists' wrenches, shears, or household appliances.

The principal object of the invention is to provide a fixture of the above type having a pair of hooks which may be adjusted to required lateral distance from each other, and which may be firmly secured in such adjusted position to any required body, most convenient for operative or user.

Another object is to provide such a fixture, which will be conveniently and economically manufacturable, conveniently utilizable, salable at low cost, strong, durable, efficient, and improved.

Other objects and advantages will hereinafter appear.

In the accompanying drawing—

Fig. 1 is a front elevation of the fixture constituting the invention, showing it as it appears when its hooks are set at their closest approach.

Fig. 2 is a cross-sectional side elevation of the fixture, taken on the line 2—2 of Fig. 1.

Figs. 3 and 4 are front elevations of the fixture, showing it with its hooks adjusted to varying distances for the reception and maintenance of different implements.

Fig. 5 is a rear elevation of the fixture shown in Fig. 1, but illustrating it with its hooks opened laterally apart.

The fixture 1 comprises a pair of hooks 2, each of which is provided with a shank 3, and the latter are pivoted to each other at 4. Said pivoting consists of a stamped out rim 5 surrounding an opening 6 formed in a terminal of one of said shanks 3 passing through a hole 7 of the terminal of the other shank and being riveted thereagainst, as shown in Fig. 2, whereby the shanks 3 may be swung about the pivot 4 as a hinge and the hooks 2 placed either at closest approach, Fig. 1, or they may be adjusted laterally from each other at any required distance, shown in Figs. 3, 4, about said hinge. Setting of the hooks 2 at their closest approach, produces abutment of edges 8 of the shanks 2 to thereby limit movement of the hooks toward each other, and when the hooks are spread laterally to maximum distance, a terminal edge 9 of one of the shanks 3 abuts against a shoulder 10 formed on the other shank to limit the extent. Due to the terminal 11 of the right-hand shank 3 being pressed out forwardly, Fig. 2, and provision of the pressed out rim 5 for forming the pivoting and opening 6, there is produced a common flushness of the said pivoting and the rear surfaces of both shanks 3, whereby the entire fixture may be therefore placed flushly against any surface to which it may have to be secured for efficient mounting. Each of the shanks 3 is provided with a hole 12 for therethrough passing a screw or bolt, for securing the fixture. Each of the hooks 2 is preferably of crescent-shaped transverse-sectional configuration for imparting strength and durability to these members.

In utilizing the supporting fixture 1, the user adjusts its hooks 2 to either the position shown in Fig. 1 or to any lateral distance from each other illustrated in Figs. 3, 4, as may be required for suspending or supporting various tools or implements, shown by the dash and dot lines, and he then passes screws through the holes 12 for securing the fixture in such adjusted position to the machine or other body, thereby providing for the convenient support and ready availability of the commonly needed tool for promoting the efficiency of the work to be performed. If any tool, as shown in Fig. 3, is unduly heavy and the supporting body not quite strong, the fixture may be additionally secured by passing a screw or bolt through the opening 6 of the pivot and into the fixed body.

Variations may be resorted to within the scope of the invention.

Having thus described my invention, I claim:

1. A fixture adaptable for supporting any one of varieties of implements having the combination of a pair of hooks each provided with a shank, said shanks being pivoted to each other to preliminarily adjust the lateral distancing of said hooks from each other in connection with installation to adapt the fixture for supporting a particular implement, and each of said shanks being provided with means for securing it to an object in said selected adjusted position.

2. A fixture adaptable for supporting any one of varieties of implements having the combination of a pair of hooks each provided with a shank, said shanks being pivoted to each other to preliminarily adjust the lateral distancing of said hooks from each other in connection with installation to adapt the fixture for supporting a particular implement, and each of said shanks being provided with an opening for therewith securing it to an object in said selected adjusted position.

3. A fixture adaptable for supporting any one of varieties of implements having the combination of a pair of hooks each provided with a shank, said shanks being pivoted to each other to preliminarily adjust the lateral distancing of said hooks from each other in connection with installation to adapt the fixture for supporting a particular implement, means for securing said shanks to an object in said selected adjusted position, and said shanks having means to limit their pivotal openings.

4. A fixture adaptable for supporting any one of varieties of implements having the combination of a pair of hooks each provided with a shank, said shanks having pivoting means to preliminarily adjust the lateral distancing of said hooks from each other in connection with installation to adapt the fixture for supporting a particular implement, means for securing said shanks to an object in said selected adjusted position, and said shanks and pivoting means being all flush with each other for placing the fixture flushly against said object.

5. A fixture adaptable for supporting any one of varieties of implements having the combination of a pair of hooks each provided with a shank, said shanks having pivoting means to preliminarily adjust the lateral distancing of said hooks from each other in connection with installation to adapt the fixture for supporting a particular implement, each of said shanks being provided with means for securing it to an object in said selected adjusted position, and said pivoting means being provided with means for additionally securing the fixture to the object.

6. A fixture adaptable for supporting any one of varieties of implements having the combination of a pair of hooks each provided with a shank, said shanks having pivoting means to preliminarily adjust the lateral distancing of said hooks from each other in connection with installation to adapt the fixture for supporting a particular implement, each of said shanks being provided with an opening for therewith securing it to an object in said selected adjusted position, and said pivoting means being provided with an opening for therewith additionally securing the fixture to the object.

7. A fixture adaptable for supporting any one of varieties of implements having the combination of a pair of hooks each provided with a shank, said shanks having pivoting means to preliminarily adjust the lateral distancing of said hooks from each other in connection with installation to adapt the fixture for supporting a particular implement, each of said shanks being provided with an opening for therewith securing it to an object in said selected adjusted position, said pivoting means being provided with an opening for therewith additionally securing the fixture to the object, and said pivoting means including an integral portion of one of said shanks passing through the other of said shanks.

8. A fixture adaptable for supporting any one of varieties of implements having the combination of a pair of hooks each provided with a shank, said shanks having pivoting means to preliminarily adjust the lateral distancing of said hooks from each other in connection with installation to adapt the fixture for supporting a particular implement, each of said shanks being provided with an opening for therewith securing it to an object in said selected adjusted position, said pivoting means being provided with an opening for therewith additionally securing the fixture to the object, said pivoting means including an integral portion of one of said shanks passing through the other of said shanks, and said shanks and pivoting means being all flush with each other for placing the fixture flushly against said object.

ERIC HAGERSTROM.